(12) United States Patent
O'Leary

(10) Patent No.: US 12,479,573 B2
(45) Date of Patent: Nov. 25, 2025

(54) AIRFOIL WITH SUPERSONIC WAVE-TRIPPING STRUCTURE

(71) Applicant: Patrick O'Leary, Jacksonville, FL (US)

(72) Inventor: Patrick O'Leary, Jacksonville, FL (US)

( * ) Notice: Subject to any disclaimer, the term of this patent is extended or adjusted under 35 U.S.C. 154(b) by 328 days.

(21) Appl. No.: 17/856,320

(22) Filed: Jul. 1, 2022

(65) Prior Publication Data
US 2023/0174231 A1 Jun. 8, 2023

Related U.S. Application Data

(60) Provisional application No. 63/286,387, filed on Dec. 6, 2021.

(51) Int. Cl.
*B64C 30/00* (2006.01)
*B64C 3/14* (2006.01)

(52) U.S. Cl.
CPC ............... *B64C 30/00* (2013.01); *B64C 3/14* (2013.01); *B64C 2003/146* (2013.01); *B64C 2003/149* (2013.01)

(58) Field of Classification Search
CPC ..... B64C 30/00; B64C 3/14; B64C 2003/146; B64C 2003/149
USPC ...................................................... 244/200.1
See application file for complete search history.

(56) References Cited

U.S. PATENT DOCUMENTS

| | | | | | |
|---|---|---|---|---|---|
| 2,261,558 A | * | 11/1941 | Orloff | ...................... | B64C 21/02 |
| | | | | | 114/67 R |
| 2,549,760 A | * | 4/1951 | Adams | ..................... | B64C 9/146 |
| | | | | | 244/215 |
| 3,463,418 A | * | 8/1969 | Miksch | .................... | B64C 23/06 |
| | | | | | 244/17.11 |
| 4,434,957 A | * | 3/1984 | Moritz | ..................... | B64C 21/10 |
| | | | | | 416/223 R |
| 4,890,803 A | * | 1/1990 | Smith | ....................... | B64C 3/48 |
| | | | | | 244/219 |
| 5,540,406 A | * | 7/1996 | Occhipinti | ............. | B64C 21/10 |
| | | | | | 244/200.1 |

(Continued)

OTHER PUBLICATIONS

Hamid, "Passive Control of Shock Oscillation Around a Biconvex Circular Arc Airfoil in a Channel", Procedia Engineering, Dec. 2014 (Year: 2014).*

(Continued)

*Primary Examiner* — Kimberly S Berona
*Assistant Examiner* — Katherine June Walter
(74) *Attorney, Agent, or Firm* — The Marbury Law Group, PLLC

(57) ABSTRACT

A wing structure for a supersonic aircraft including a pair of supersonic wave-tripping channels formed on each of two laterally extending wings of the supersonic aircraft, wherein each of the pair of supersonic wave-tripping channels extend in a span-wise direction of the wings respectively, wherein an upper supersonic wave-tripping channel of the pair of supersonic wave-tripping channels is disposed on an upper surface of each of the wings and a lower supersonic wave-tripping channel of the pair of supersonic wave-tripping channels is disposed on a lower surface of each of the wings, wherein the upper supersonic wave-tripping channel and the lower supersonic wave-tripping channel are set back from a leading edge of the wings respectively.

4 Claims, 4 Drawing Sheets

(56) References Cited

U.S. PATENT DOCUMENTS

| | | | |
|---|---|---|---|
| 5,598,990 A * | 2/1997 | Farokhi | B64C 23/06 296/180.1 |
| 6,857,599 B2 | 2/2005 | Tracy et al. | |
| 7,686,256 B2 * | 3/2010 | Miller | F15D 1/12 244/200.1 |
| 7,946,535 B2 | 5/2011 | Chase et al. | |
| 8,382,043 B1 | 2/2013 | Raghu | |
| 2021/0300542 A1 | 9/2021 | Scholl et al. | |

OTHER PUBLICATIONS

Olsman, "Numerical Simulation of Flow over an Airfoil with a Cavity", AIAA Journal vol. 49 No. 1, (2011) (Year: 2011).*

* cited by examiner

AIRFOIL WITH SUPERSONIC WAVE-TRIPPING STRUCTURE

RELATED APPLICATIONS

This application claims the benefit of priority to U.S. Provisional Application No. 63/286,387 entitled "Airfoil With Supersonic Wave-Tripping Structure" filed Dec. 6, 2021, the entire contents of which is incorporated herein by reference.

BACKGROUND

As an object, such as the wing of an aircraft, moves through a gas (e.g., air), the gas molecules are deflected around the object. The deflection originates at the leading edge of that object. If the speed of the object increases to near or above the speed of sound, compressibility effects the gas. In particular, the density of the gas varies locally as the gas is compressed by the object, there is an abrupt decrease in the flow area, and a shock wave is generated. Shock waves are regions of airflow, along a surface of an object (e.g., an airfoil) in which the properties of that airflow (i.e., fluid pressure and density) change dramatically. Across a shock wave, the static pressure and air density increase almost instantaneously. Shock wave formation causes an increase in drag, reduced controllability, and other undesirable effects, which place a higher demand on engines and reduces fuel efficiency. When designing aircraft that travel near or above the speed of sound, the reduction or elimination of shock waves is desirable.

FIGS. 1A-1C illustrate schematic cross-sectional views of an airfoil 100 moving in fluid environments 101, 102, 103 at different speeds, denoted as three different airflow velocities $F_1$, $F_2$, $F_3$. The airfoil 100 has a thin oblong shape, which is a common shape for supersonic aircraft airfoils, with a leading edge 110 facing the airflow and a trailing edge 120 on an opposed end. The airfoil 100 naturally parts the air flow across upper and lower surfaces thereof.

FIG. 1A shows an airflow in a first fluid environment 101 with a first relative airflow velocity $F_1$ meeting the leading edge 110 of the airfoil 100. The first relative airflow velocity $F_1$ is approximately 15% below Mach number, which is the ratio of the speed of a body to the speed of sound in the surrounding medium. The first relative airflow velocity $F_1$ causes supersonic flow regions 15, 25 on segments of the upper and lower airfoil surfaces. The supersonic flow regions 15, 25 build up from pressures applied at the leading edge 110, that increase airflow speed on the upper and lower airfoil surfaces until they reach transonic flow points 11, 21, where the relative airspeed transitions from subsonic to supersonic flow. The supersonic flow regions 15, 25 build in size from the transonic flow points 11, 21 in a curved pattern as shown. Eventually, the airflow in the supersonic flow regions 15, 25 builds up enough to form shockwaves 10, 20. The airflow aft of the shockwaves 10, 20 has a dramatically reduced pressure and density, which causes drag and instability.

FIG. 1B shows an airflow in a second fluid environment 102 with a second relative airflow velocity $F_2$ of approximately 12% below Mach number. The second relative airflow velocity $F_2$ causes larger supersonic flow regions 35, 45 on segments of the upper and lower airfoil surfaces. The larger supersonic flow regions 35, 45 also have transonic flow points 31, 41, where the relative airspeed transitions from subsonic to supersonic flow. The larger supersonic flow regions 35, 45 also have a curved pattern, but the shockwaves 30, 40 develop further aft on the airfoil 100. Nonetheless, the shockwaves 30, 40 still are associated with a dramatic reduction in pressure and density, which causes drag and instability.

FIG. 1C shows an airflow in a third fluid environment 103 with a third relative airflow velocity $F_3$ of approximately 5% below Mach number. The third relative airflow velocity $F_3$ causes even larger supersonic flow regions 55, 65 on segments of the upper and lower airfoil surfaces. The even larger supersonic flow regions 55, 65 also have transonic flow points 51, 61 and a curved pattern, but additionally include flow separations 171, 181 near the trailing edge 120. Also, the shockwaves 50, 60 form aft of the trailing edge 120, above and below the flow separations 171, 181, respectively. As above, the shockwaves 50, 60 are associated with a dramatic reduction in pressure and density, which causes drag and instability to the airfoil 100.

SUMMARY

Various aspects include wing structures for a supersonic aircraft that minimize and/or eliminate shockwaves from supersonic airflow over the wing of the supersonic aircraft. The wing structure for a supersonic aircraft may include a pair of supersonic wave-tripping channels formed on each of two laterally extending wings of the supersonic aircraft. Each of the pair of supersonic wave-tripping channels may extend in a span-wise direction of the wings respectively, wherein an transonic flow points of the pair of supersonic wave-tripping channels is disposed on an upper surface of each of the wings and a lower supersonic wave-tripping channel of the pair of supersonic wave-tripping channels is disposed on a lower surface of each of the wings. The upper supersonic wave-tripping channel and the lower supersonic wave-tripping channel may be set back from a leading edge of the wings respectively.

BRIEF DESCRIPTION OF THE DRAWINGS

The accompanying drawings, which are incorporated herein and constitute part of this specification, illustrate exemplary embodiments of the claims and together with the general description given above and the detailed description given below, serve to explain the features of the claims.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include a wing structure for a supersonic aircraft that includes a pair of supersonic wave-tripping channels formed on each of two laterally extending wings of the supersonic aircraft. Each of the pair of supersonic wave-tripping channels extend in a span-wise direction of the wings respectively. An upper supersonic wave-tripping channel of the pair of supersonic wave-tripping channels is disposed on an upper surface of each of the wings and a lower supersonic wave-tripping channel of the pair of supersonic wave-tripping channels is disposed on a lower surface of each of the wings. The upper supersonic wave-tripping channel and the lower supersonic wave-tripping channel are set back from a leading edge of the wings respectively.

In accordance with various embodiments, as the sonic wave pressure build-up reaches the supersonic wave-tripping channel, a pressure reduction is caused that "trips" (i.e., dissipates) the sonic wave pressure build-up. The energy is not only pulled into the channel, but also diverted down the span of the wing. By tripping the build-up of pressure that would otherwise cause a shock wave, the supersonic wave-tripping channel promotes laminar flow across the wing surfaces, thus improving aerodynamics of the supersonic aircraft. This reduction in pressure and improvements in laminar flow may reduce loads and thus decrease the energy/fuel consumption of the engines driving propulsion of the supersonic aircraft.

Tripping the sonic wave causes the pressure density across the surfaces of the wing to remain more constant, thus disrupting the creation of a shockwave. By using a swept wing design, the energy from the tripped wave may be encouraged to dissipate along the span-wise direction of the wing and eventually be released at the wing tip. This configuration, in accordance with various embodiments may obviate the need for winglets at the tips of the wings.

Figure 1A:
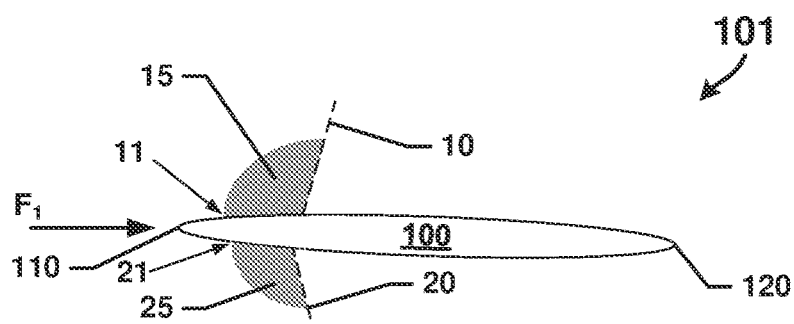
FIGS. 1A-1C illustrate schematic cross-sectional views of an airfoil moving in a fluid at different speeds and creating shockwaves, as is known in the art.
Figure 1B:
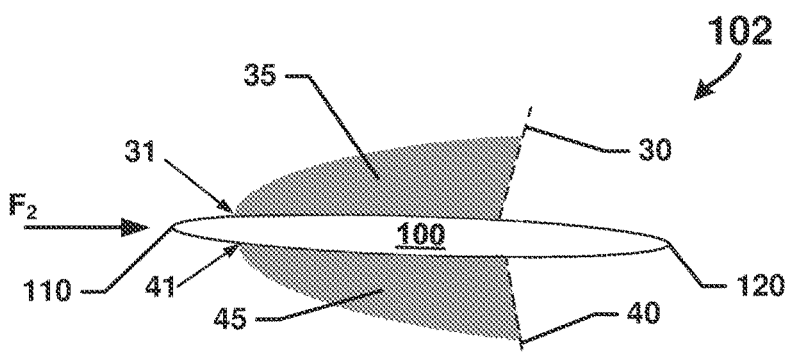
Figure 1C:
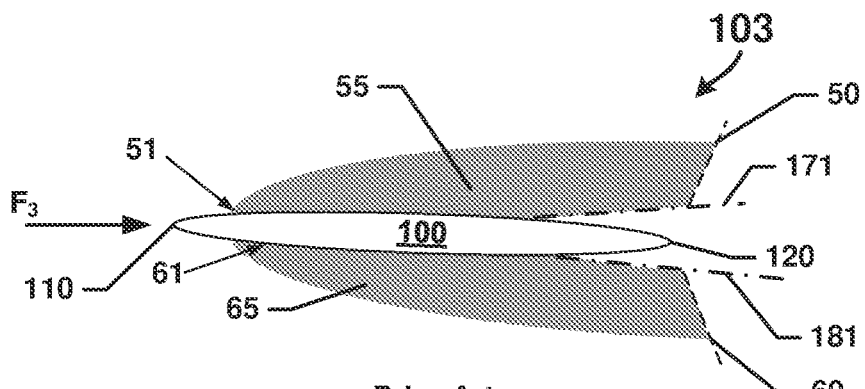
Figure 2A:
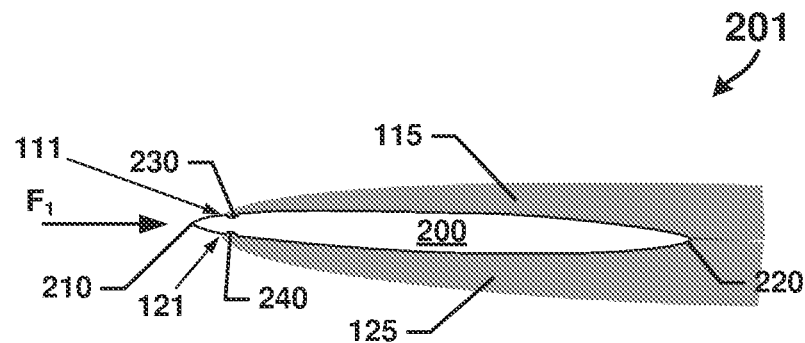
FIGS. 2A-2C illustrate schematic cross-sectional views of an airfoil moving in a fluid at different speeds without creating shockwaves in accordance with various embodiments.
Figure 2B:
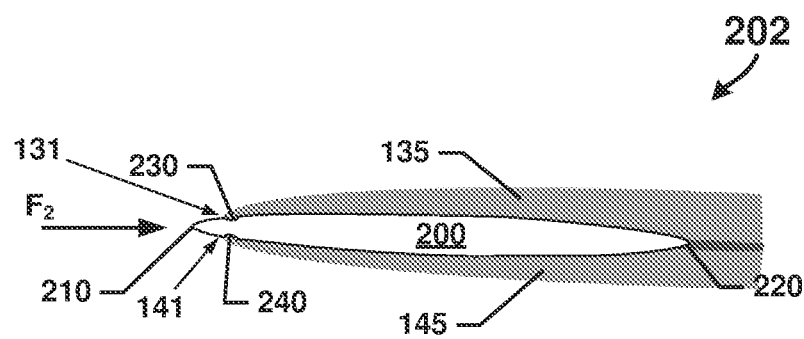
Figure 2C:
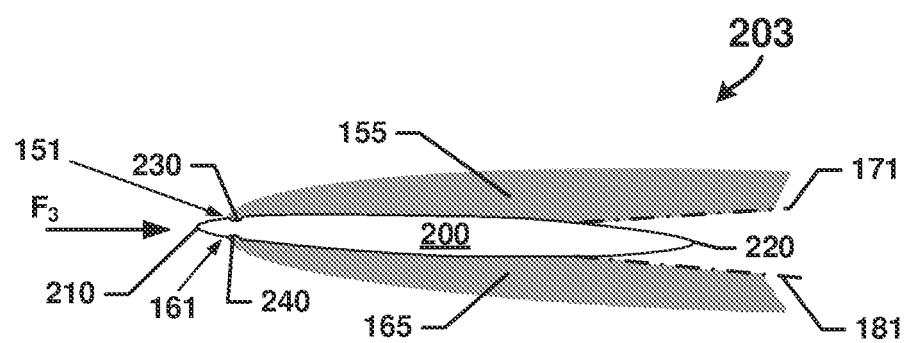

FIGS. 2A-2C show an airfoil 200 in accordance with various embodiments. The airfoil 200 is shown moving in a fluid at different speeds, denoted as three different airflow velocities $F_1$, $F_2$, $F_3$. The airfoil 200 has a thin oblong shape with a leading edge 210 facing the airflow and a trailing edge 220 on an opposed end. In addition, in accordance with various disclosed aspects, the airfoil 200 includes a pair of supersonic wave-tripping channels 230, 240. The pair of supersonic wave-tripping channels 230, 240 are formed on each of two laterally extending wings of the supersonic aircraft. Also, each of the pair of supersonic wave-tripping channels 230, 240 extend in a span-wise direction of the wings respectively. An upper supersonic wave-tripping channel 230, of the pair of supersonic wave-tripping channels, is disposed on an upper surface of the airfoil 200. Also, a lower supersonic wave-tripping channel 240, of the pair of supersonic wave-tripping channels, is disposed on a lower surface of the airfoil 200. The upper supersonic wave-tripping channel 230 and the lower supersonic wave-tripping channel 240 are set back from the leading edge 210 respectively.

In various embodiments, the surface of the airfoil 200 between the leading edge 210 and the forward edge of each supersonic wave-tripping channel 230, 240 is preferably a smooth and continuous curve. The supersonic wave-tripping channel 230, 240 is the first discontinuity encountered by the airflow passing along the surfaces. In this way, as soon as the surface contour of the airfoil becomes discontinuous, by virtue of the supersonic wave-tripping channel 230, 240, the supersonic flow regions will be disrupted and preventing from getting big enough to form a shockwave. This disruption may be referred to "tripping the shockwave." Part of the energy that would otherwise have developed into a shockwave will travel along the channel in a span-wise direction to the wing tip.

FIG. 2A shows an airflow in a first fluid environment 201 with the first relative airflow velocity $F_1$ (i.e., 15% below Mach number) meeting the leading edge 210 of the airfoil 200. The first relative airflow velocity $F_1$ causes supersonic flow regions 115, 125 on segments of the upper and lower airfoil surfaces. The supersonic flow regions 115, 125 build up from pressures applied at the leading edge 210, that increase airflow speed on the upper and lower airfoil surfaces. However, as the airflow passes the pair of supersonic wave-tripping channels 230, 240, the surface discontinuity provides a pressure relief that prevents a pressure buildup sufficient to form a shock wave.

The location of the pair of supersonic wave-tripping channels 230, 240 will be substantially closer to the leading edge 210 than the trailing edge 220 since it should coincide with the location of transonic flow points 111, 121. The location of the pair of supersonic wave-tripping channels 230, 240 on the airfoil 200 may be configured, based on the intended service environment, to best prevent the shockwave from occurring. For example, a location of the pair of supersonic wave-tripping channels 230, 240 may correspond to just aft of where the pair of transonic flow points 111, 121 are predicted to form. Alternatively, the location of the pair of supersonic wave-tripping channels 230, 240 may correspond to just before or in the location of approximately where the pair of transonic flow points 111, 121 are predicted to form. The predicted location of the transonic flow points 111, 121 may be determined from computational modeling based on the overall airfoil profile.

The supersonic flow regions 115, 125 still build up in size from transonic flow points 111, 121 in a curved pattern as shown, but build up less than what occurs on a conventional airfoil. In this way, the airflow in the supersonic flow regions 115, 125 never builds up enough to form shockwaves.

FIG. 2B shows an airflow in a second fluid environment 202 with the second relative airflow velocity $F_2$ (i.e., 12% below Mach number) meeting the leading edge 210 of the airfoil 200. The second relative airflow velocity $F_2$ causes similar supersonic flow regions 135, 145 on segments of the upper and lower airfoil surfaces to those describe above with regard to FIG. 2A. The supersonic flow regions 135, 145 associated with the second relative airflow velocity $F_2$ may also have transonic flow points 131, 141, where the relative airspeed transitions from subsonic to supersonic flow. Similarly, the supersonic flow regions 135, 145 never develop shockwaves as a result of the pair of supersonic wave-tripping channels 230, 240.

FIG. 2C shows an airflow in a third fluid environment 203 with the third relative airflow velocity $F_3$ (i.e., 5% below Mach number) meeting the leading edge 210 of the airfoil 200. The third relative airflow velocity $F_3$ causes similar supersonic flow regions 155, 165 on segments of the upper and lower airfoil surfaces to those describe above with regard to FIGS. 2A and 2B. The supersonic flow regions 155, 165 associated with the third relative airflow velocity $F_3$ may also have transonic flow points 151, 161, where the relative airspeed transitions from subsonic to supersonic flow. Similarly, the supersonic flow regions 155, 165 never develop shockwaves as a result of the pair of supersonic wave-tripping channels 230, 240.

Figure 3A:
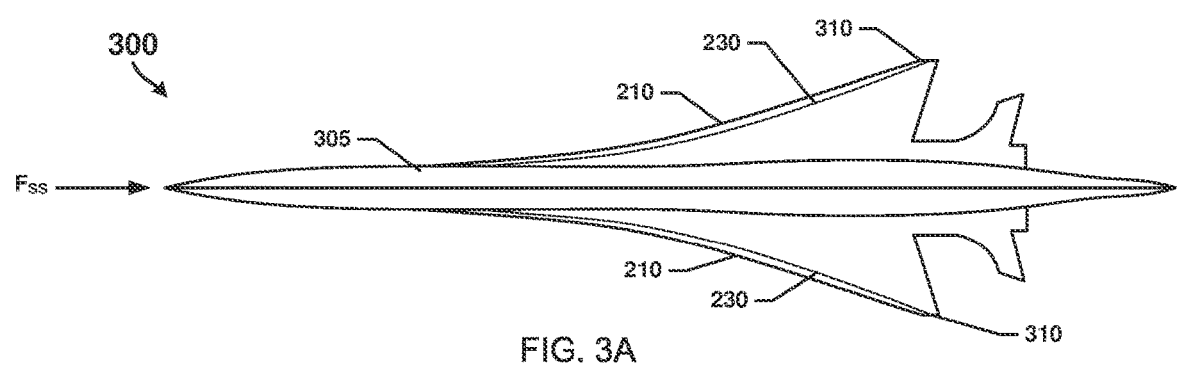
FIGS. 3A-3B illustrate schematic top and side views of a supersonic aircraft with wings including supersonic wave-tripping channels, in accordance with various embodiments.
Figure 3B:
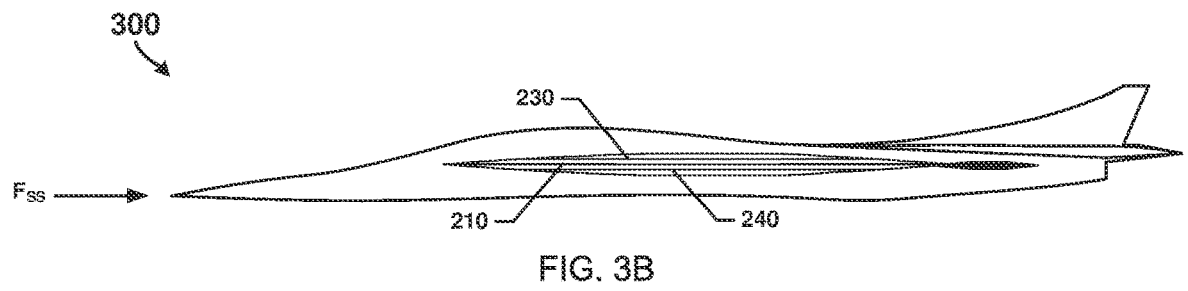

FIGS. 3A-3B show top and side views of a supersonic aircraft 300 with wings including supersonic wave-tripping channels 230, 240, in accordance with various embodiments. FIG. 3A particularly shows the upper supersonic wave-tripping channel 230 on each wing extend in a span-wise direction, from the fuselage 305 to the wingtip 310. A tapered wing design may promote the shockwave pressure release that propagates toward the wingtip 310, as another aspect for preventing shockwave development.

Figure 4A:
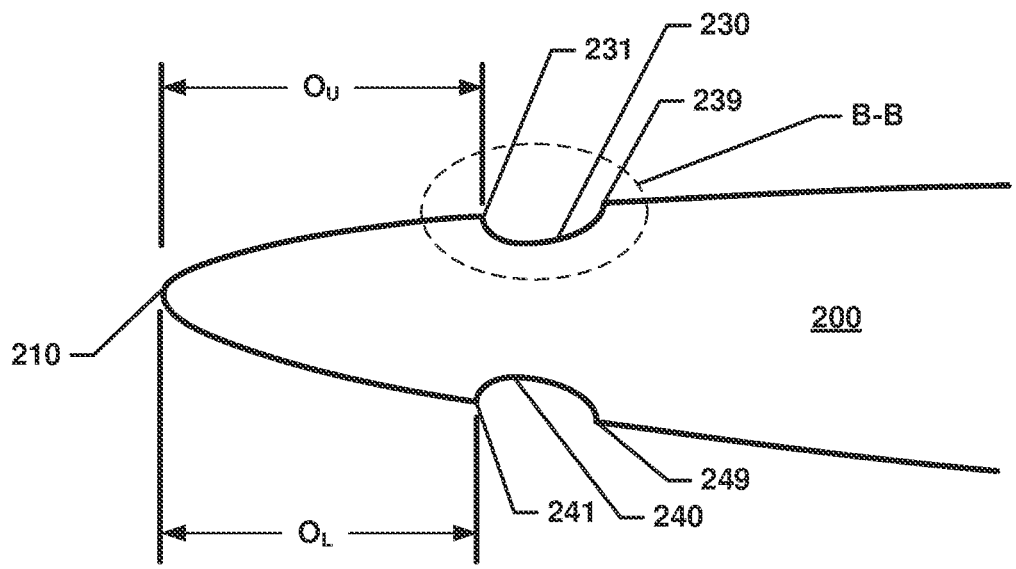
FIG. 4A illustrates a relief view of a forward portion of the airfoil in FIGS. 2A-2C, in accordance with various embodiments.

FIG. 4A shows a relief view of a forward portion of the airfoil in FIGS. 2A-2C, in accordance with various embodiments. The pair of supersonic wave-tripping channels 230, 240 are each disposed on upper and lower surfaces, respectively, of the airfoil 200. The first supersonic wave-tripping channel 230 includes a first forward edge 231 and a first rear edge 239. An upper channel setback from the leading edge 210 corresponds to an upper distance $O_U$ from the leading edge 210 to the first forward edge 231. The second supersonic wave-tripping channel 240 includes a second forward edge 241 and a second rear edge 249. A lower channel setback corresponds to a lower distance $O_L$ from the leading edge 210 to the second forward edge 241. The first and second forward edges 231, 241 of each supersonic wave-tripping channel 230, 240 may be the first significant surface discontinuity on the respective wing from a leading edge thereof. The upper distance $O_U$ and the lower distance $O_L$ may corresponds to transonic flow points on the upper and lower surfaces, respectively, of the wings. While the upper distance $O_U$ and the lower distance $O_L$ are illustrated as being roughly equal, they need not be.

Figure 4B:
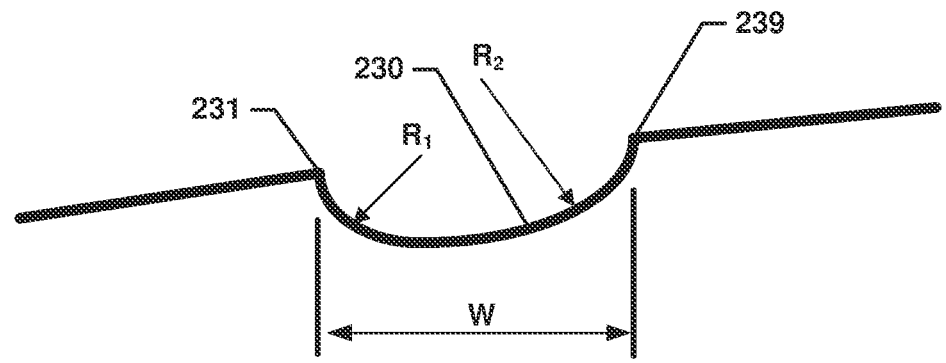
FIG. 4B illustrates a further relief view of the supersonic wave-tripping channel in FIG. 4A at B-B, in accordance with various embodiments.

FIG. 4B illustrates a further relief view of the upper supersonic wave-tripping channel 230 in FIG. 4A at B-B, in accordance with various embodiments. It should be understood that the characteristics and details described herein for the upper supersonic wave-tripping channel 230 may similarly apply to the lower supersonic wave-tripping channel (e.g. 240 in FIGS. 4A-4C). In various embodiments, the upper supersonic wave-tripping channel 230 may have a generally semi-circular shape. However, in some embodiments, the upper supersonic wave-tripping channel 230 may have a different curvature in different portions thereof. For example, a forward portion of the lower surface of the upper supersonic wave-tripping channel 230 may have a first curvature with a first radius $R_1$, while a rear portion of the lower surface of the upper supersonic wave-tripping channel 230 may have a second curvature with a second radius $R_2$. The first and second curvatures may seamlessly join in the upper supersonic wave-tripping channel 230 defining an overall width W of the upper supersonic wave-tripping channel 230.

The channel size (e.g., individual curvature radii or channel width) may be designed to optimize flows at cruising speeds for maximum energy efficiencies. The dimensions and ratios of the channels may be designed consistent with the airfoils intended service environment. The details of engineering are contingent on the airfoil characteristics and intended service.

Figure 5:
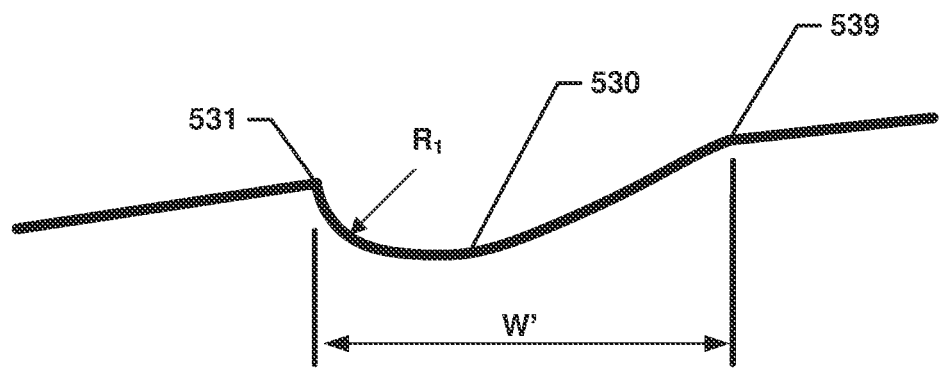
FIG. 5 illustrates a semi-droplet shaped supersonic wave-tripping channel, in accordance with various embodiments.

The FIG. 5 illustrates a semi-droplet shaped supersonic wave-tripping channel 530, in accordance with various embodiments. In order to avoid the reestablishment of a shock wave caused by the rear edge (e.g., the first rear edge 239) of the upper supersonic wave-tripping channel 230, various embodiments may provide a smooth rear transition of the supersonic wave-tripping channel 530 with the rear upper surfaces of the airfoil. Thus, a cross-section of the upper supersonic wave-tripping channel 530 may form a semi-droplet shape, with a relatively small forward radius $R_1$ forming the channel from a semi-droplet forward edge 531 that tapers to a planar surface or even a large-radius convex surface that smoothly joins with the rear upper surfaces of the airfoil at a semi-droplet rear edge 539. The details of engineering of the semi-droplet shaped supersonic wave-tripping channel 530, including setback distance from the leading edge may be contingent on the airfoil characteristics and intended service environment.

Any or all aspects of the airfoil with supersonic wave-tripping structure described herein may be integrated into the wing section of an airfoil of an airplane wing, a wing flap, a tail rudder and its flap or an inlet vane of a compressor blade or on a wind turbine blade, or an intake of an aircraft engine. For example, wave tripping may be enabled by incorporating the wing structure of various embodiments into an airfoil. This results in increased lift force, reduction of aerodynamic drag and reduction of download during vertical take-off and landing operations. Similarly, incorporating the wing structure of various embodiments into the rudder or tail wing will result in increased control forces required to steer the airplane thus reducing the tail wing size for generating a required control force. This will result in savings of weight and fuel required for the flights.

The foregoing descriptions of systems, devices, and methods are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are used to guide the reader through the description of the methods. Further, any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A wing structure for a supersonic aircraft comprising:
a pair of supersonic wave-tripping channels formed on each of two laterally extending wings of the supersonic aircraft, wherein each of the pair of supersonic wave-tripping channels extend continuously further in a span-wise direction of the wings than in a direction directly between a leading and trailing edge of the wings, wherein an upper supersonic wave-tripping channel of the pair of supersonic wave-tripping channels is disposed on an upper surface of each of the wings and a lower supersonic wave-tripping channel of the pair of supersonic wave-tripping channels is disposed on a lower surface of each of the wings, wherein the upper supersonic wave-tripping channel and the lower supersonic wave-tripping channel are set back from the leading edge of the wings respectively, wherein each of the pair of supersonic wave-tripping channels extend continuously across substantially the entire length of the respective wings.

2. The wing structure of claim 1, wherein a distance of the set back from the leading edge corresponds to transonic flow points on the upper and lower surfaces of the wings.

3. The wing structure of claim 1, wherein a cross-section of at least one of the pair of supersonic wave-tripping channels has a semi-droplet shape.

4. The wing structure of claim 1, wherein a forward edge of each of the pair of supersonic wave-tripping channels is a first significant surface discontinuity on the respective wing from the leading edge thereof.

\* \* \* \* \*